(12) United States Patent
Satou et al.

(10) Patent No.: US 10,613,217 B2
(45) Date of Patent: Apr. 7, 2020

(54) ON-BOARD RADAR APPARATUS, NOTIFICATION SYSTEM, AND TRAVELLING VEHICLE DETECTION METHOD OF ON-BOARD RADAR APPARATUS

(71) Applicant: DENSO CORPORATION, Kariya, Aichi-pref. (JP)

(72) Inventors: Miki Satou, Kariya (JP); Yasuyuki Miyake, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 444 days.

(21) Appl. No.: 15/325,868

(22) PCT Filed: Jul. 9, 2015

(86) PCT No.: PCT/JP2015/069782
§ 371 (c)(1),
(2) Date: Jan. 12, 2017

(87) PCT Pub. No.: WO2016/009945
PCT Pub. Date: Jan. 21, 2016

(65) Prior Publication Data
US 2017/0176593 A1 Jun. 22, 2017

(30) Foreign Application Priority Data

Jul. 16, 2014 (JP) .................. 2014-145981

(51) Int. Cl.
*G01S 13/93* (2020.01)
*B60R 21/00* (2006.01)
(Continued)

(52) U.S. Cl.
CPC ............ *G01S 13/931* (2013.01); *B60R 21/00* (2013.01); *G01S 7/35* (2013.01); *G01S 13/345* (2013.01);
(Continued)

(58) Field of Classification Search
CPC ..... G01S 2013/9332; G01S 2013/9371; G01S 2013/9385; G01S 13/931; G01S 13/52;
(Continued)

(56) References Cited

U.S. PATENT DOCUMENTS

2004/0252047 A1  12/2004  Miyake et al.
2009/0102698 A1  4/2009  Ichiyanagi et al.
(Continued)

FOREIGN PATENT DOCUMENTS

CN    103245946    8/2013
JP    H06-162397 A  6/1994
(Continued)

*Primary Examiner* — Peter M Bythrow
(74) *Attorney, Agent, or Firm* — Knobbe, Martens, Olson & Bear, LLP (57) ABSTRACT

A radar apparatus detects an observation point distance and an observation point azimuth. In addition, the radar apparatus calculates an observation point lateral position and an observation point vertical position based on the observation point distance and the observation point azimuth. Furthermore, the radar apparatus determines that a traveling vehicle is detected when a number of observation points included within a side determination range is equal to or greater than a predetermined traveling vehicle determination count, based on the observation point lateral position and the observation point vertical position. The side determination range is set so as to include a passing determination line so as to extend in a direction at 90 degrees relative to a front-rear direction of the vehicle to the side of the vehicle.

23 Claims, 4 Drawing Sheets

(51) Int. Cl.
  *G08G 1/16* (2006.01)
  *G01S 13/34* (2006.01)
  *G01S 13/42* (2006.01)
  *G01S 7/35* (2006.01)
  *G01S 13/56* (2006.01)
  *B60R 21/0134* (2006.01)
  *G01S 13/931* (2020.01)

(52) U.S. Cl.
  CPC .............. *G01S 13/42* (2013.01); *G01S 13/56* (2013.01); *G08G 1/163* (2013.01); *G08G 1/165* (2013.01); *G08G 1/166* (2013.01); *B60R 21/0134* (2013.01); *G01S 2013/9332* (2013.01); *G01S 2013/9378* (2013.01)

(58) Field of Classification Search
  CPC .......... G01S 13/50; G01S 13/56; G01S 13/42; G01S 13/345; G01S 13/343; G01S 13/34; G01S 7/35; G01S 7/352; B60R 21/0134; G08G 1/16; G08G 1/163; G08G 1/166; G08G 1/167
  See application file for complete search history.

(56) References Cited

U.S. PATENT DOCUMENTS

| | | | | |
|---|---|---|---|---|
| 2010/0225521 | A1* | 9/2010 | Mochizuki | G01S 13/345 342/70 |
| 2012/0194377 | A1* | 8/2012 | Yukumatsu | G01S 13/931 342/70 |
| 2013/0207832 | A1* | 8/2013 | Mizutani | G01S 7/4026 342/70 |
| 2014/0354450 | A1* | 12/2014 | Takahashi | G01S 13/42 340/904 |
| 2015/0219756 | A1* | 8/2015 | Ishimori | G08G 1/165 342/147 |

FOREIGN PATENT DOCUMENTS

| | | |
|---|---|---|
| JP | 2003-237407 A | 8/2003 |
| JP | 2004-340755 A | 12/2004 |
| JP | 2010-38706 A | 2/2010 |
| JP | 2010-43960 A | 2/2010 |
| JP | 2011-047694 A | 3/2011 |
| JP | 2013-174556 A | 9/2013 |

* cited by examiner

ON-BOARD RADAR APPARATUS, NOTIFICATION SYSTEM, AND TRAVELLING VEHICLE DETECTION METHOD OF ON-BOARD RADAR APPARATUS

CROSS-REFERENCE TO RELATED APPLICATION

This application is a U.S. National Phase Application under 35 U.S.C. 371 of International Application No. PCT/JP2015/069782 filed on Jul. 9, 2015 and published in Japanese as WO 2016/009945 A1 on Jan. 21, 2016. This application is based on and claims the benefit of priority from Japanese Patent Application No. 2014-145981, filed Jul. 16, 2014. The entire disclosures of all of the above applications are incorporated herein by reference.

TECHNICAL FIELD

The present invention relates to an on-board radar apparatus that detects an object present in the vicinity of a vehicle and a notification system.

BACKGROUND ART

Conventionally, an on-board radar apparatus that detects an object in the vicinity of a vehicle by irradiating radar waves as transmission waves over a predetermined angle in the vicinity of the vehicle and receiving reflected waves is known (for example, refer to PTL 1).

CITATION LIST

Patent Literature

[PTL 1] JP-A-2010-043960

SUMMARY OF INVENTION

Technical Problem

The radar apparatus detects a speed component in a direction towards an antenna surface. Therefore, when an object positioned directly next to an own vehicle is detected, the on-board radar apparatus determines that a relative speed of the object is zero. That is, the on-board radar apparatus is unable to determine whether the object positioned directly next to the own vehicle is a stationary object that is stationary or a moving object that is traveling alongside the own vehicle at the same traveling speed.

Therefore, when the on-board radar apparatus is attached to the own vehicle such that a direction at 90° relative to a front-rear direction of the vehicle is included in a detection range to detect whether or not another vehicle approaching the own vehicle has passed the side of the own vehicle, the following issues can be considered.

When another vehicle is traveling parallel beside the own vehicle for a long period of time, a state in which a relative speed detected by the on-board radar apparatus of the own vehicle is zero continues. Therefore, for example, a determination may be made that the other vehicle has completed passing the side of the own vehicle, regardless of the other vehicle being present beside the own vehicle. In addition, should a stationary object be present near the side of the own vehicle immediately after the other vehicle has completed passing the side of the own vehicle, a determination may be made that the other vehicle is present beside the own vehicle regardless of the other vehicle not being present.

The present invention has been achieved in light of such issues. An object of the present invention is to provide a technology that improves accuracy of detection of another vehicle passing the side of an own vehicle.

Solution to Problem

An on-board radar apparatus of the present invention is attached to a vehicle such that a direction at 90 degrees relative to a front-rear direction of the vehicle is included in a detection range, and transmits and receives radar waves. The on-board radar apparatus of the present invention includes an observation point detecting means, a position identifying means, and a traveling vehicle detecting means.

The observation point detecting means detects an observation point distance that is a distance to an observation point that has reflected the radar waves within the detection range and an observation point azimuth that is an azimuth at which the observation point is present.

The position identifying means identifies an observation point position that is a position of the observation point based on the observation point distance and the observation point azimuth.

The traveling vehicle detecting means determines that a traveling vehicle is detected when a number of observation points present within a side determination range is equal to or greater than a predetermined traveling vehicle determination count, based on the observation point position identified by the position identifying means. The side determination range is set so as to include a passing determination line that is predetermined so as to extend in a direction at 90 degrees relative to a front-rear direction of the vehicle to the side of the vehicle.

As a result of the on-board radar apparatus of the present invention configured in this way, when the number of observation points included within the side determination range is the traveling vehicle determination count or greater, a determination is made that a plurality of observation points positioned in a front end portion or a rear end portion of the traveling vehicle is aligned along the passing determination line. As a result, a detection can be made that the traveling vehicle has passed the side of the vehicle.

Therefore, the on-board radar apparatus of the present invention can detect that a traveling vehicle has passed the side of the vehicle based on the observation point distance and the observation point azimuth, without using relative speed in relation to a detected object. As a result, the accuracy of detection of a traveling vehicle passing can be improved.

DESCRIPTION OF EMBODIMENTS

An embodiment of the present invention will hereinafter be described with reference to the drawings.

Figure 1:
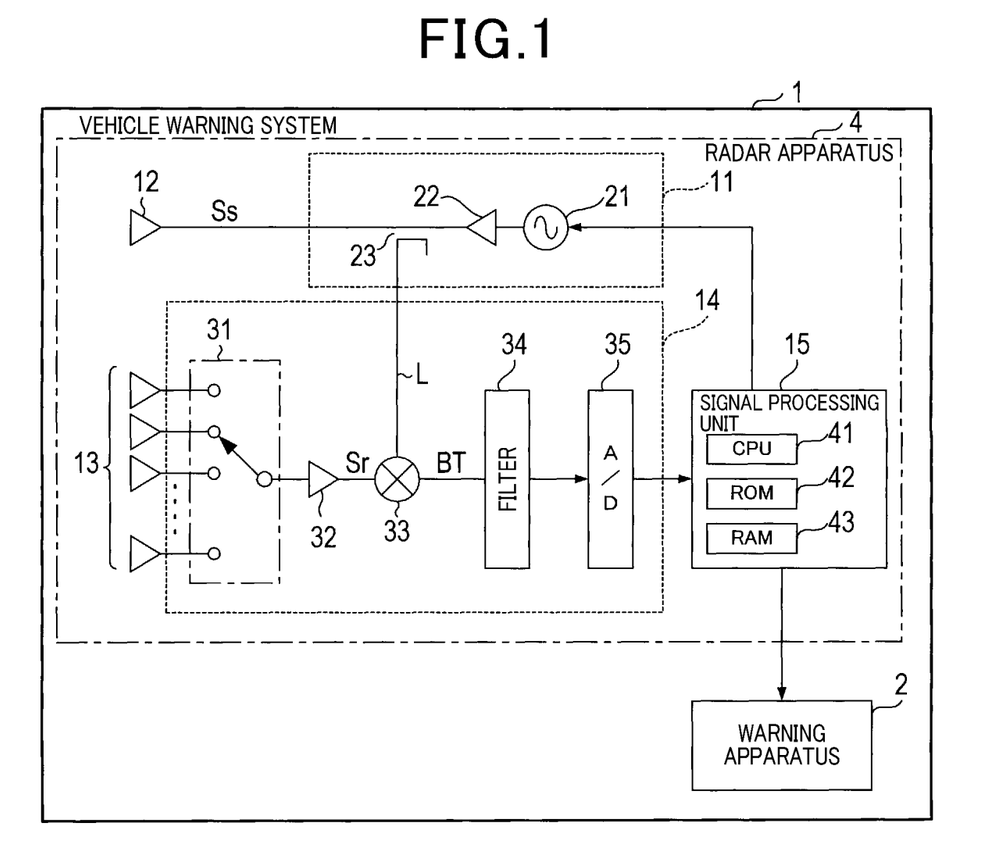
FIG. 1 is a block diagram of a configuration of a vehicle warning system according to an embodiment.

A vehicle warning system 1 according to the present embodiment is mounted in a vehicle. As shown in FIG. 1, the vehicle warning system 1 includes a warning apparatus 2 and a radar apparatus 4.

The warning apparatus 2 is an audio output apparatus that is set inside a vehicle cabin. The warning apparatus 2 issues a warning to an occupant of the vehicle (referred to, hereafter, as an own vehicle) in which the vehicle warning system 1 is mounted.

The radar apparatus 4 uses a known frequency-modulated continuous-wave (FMCW) method. The radar apparatus 4 includes a transmission circuit 11, a transmission antenna 12, a reception antenna 13, a reception circuit 14, and a signal processing unit 15.

The transmission circuit 11 supplies a transmission signal Ss to the transmission antenna 12. The transmission circuit 11 includes an oscillator 21, an amplifier 22, and a distributor 23. The oscillator 21 generates a millimeter-waveband high-frequency signal that is modulated so as to have an up-modulation interval and a down-modulation interval. In the up-modulation interval, the frequency linearly increases in relation to time. In the down-modulation interval, the frequency linearly decreases. The oscillator 21 then outputs the generated high-frequency signal. The amplifier 22 amplifies the high-frequency signal outputted from the oscillator 21. The distributor 23 performs power distribution of the output signal of the amplifier 22 to the transmission signal Ss and a local signal L.

The transmission antenna 12 irradiates a radar wave based on the transmission signal Ss supplied from the transmission circuit 11. The radar wave has a frequency that corresponds to the transmission signal Ss. As a result, a radar wave having a frequency that linearly increases and a radar wave having a frequency that linearly decreases are alternately outputted.

The reception antenna 13 is an array antenna configured such that a plurality of antenna elements are arrayed in a single row.

The reception circuit 14 includes a reception switch 31, an amplifier 32, a mixer 33, a filter 34, and an analog-to-digital (A/D) converter 35. The reception switch 31 successively selects any one of the plurality of antenna elements configuring the reception antenna 13 and outputs a reception signal Sr from the selected antenna element to the amplifier 32. The amplifier 22 amplifies the reception signal Sr inputted from the reception switch 31 and outputs the amplified reception signal Sr to the mixer 33. The mixer 33 mixes the reception signal Sr amplified by the amplifier 32 and the local signal L, and generates a beat signal BT. The filter 34 removes unnecessary signal components from the beat signal BT generated by the mixer 33. The A/D converter 35 samples the beat signal BT outputted from the filter 34 and converts the beat signal BT to digital data. The A/D converter 35 then outputs the digital data to the signal processing unit 15.

The signal processing unit 15 is an electronic control unit that is mainly configured by a known microcomputer including a central processing unit (CPU) 41, a read-only memory (ROM) 42, a random access memory (RAM) 43, and the like. The signal processing unit 15 performs signal analysis and controls operation of the radar apparatus 4 as a result of the CPU 41 preforming processes based on programs stored in the ROM 42.

Specifically, the signal processing unit 15 controls the transmission circuit 11 so that the radar waves of the up-modulation interval and the radar waves of the down-modulation interval are alternately emitted from the transmission antenna 12 at a modulation cycle Tm. In addition, the signal processing unit 15 enables the beat signal BT of each of the plurality of antenna elements configuring the reception antenna 13 to be sampled in the reception circuit 14. The signal processing unit 15 then measures a distance to a point (referred to, hereafter, as an observation point) at which the radar wave is reflected, a relative speed in relation to the observation point, and an azimuth at which the observation point is present, by analyzing the sampling data of the beat signals BT.

In the FMCW method, an up-beat signal and a down-beat signal are generated as the beat signal BT. The up-beat signal is generated by the reception signal Sr and the local signal L being mixed during the period in which the radar wave of the up-modulation interval is being transmitted. In a similar manner, the down-beat signal is generated by the reception signal Sr and the local signal L being mixed during the period in which the radar wave of the down-modulation interval is being transmitted.

Relationships in following expressions (1) and (2) are established between a frequency fbu of the up-beat signal and a frequency fbd of the down-beat signal, and a distance L (referred to, hereafter, as an observation point distance L) and a relative speed v (referred to, hereafter, as an observation point relative speed v) of the observation point. In expressions (1) and (2), c is the speed of light, $\Delta f$ is a frequency variation range of the transmission signal Ss, and f0 is a center frequency of the transmission signal Ss.

[Formula 1]

$$fbu = \frac{4 \times \Delta f \times L}{c \times Tm} - \frac{2 \times f0 \times v}{c} \quad (1)$$

$$fbd = \frac{4 \times \Delta f \times L}{c \times Tm} + \frac{2 \times f0 \times v}{c} \quad (2)$$

Therefore, the observation point distance L and the observation point relative speed v are calculated by following expressions (3) and (4).

[Formula 2]

$$L = \frac{c \times Tm}{8 \times \Delta f}(fbu + fbd) \quad (3)$$

$$v = \frac{c}{4 \times f0}(fbu - fbd) \quad (4)$$

Figure 2:
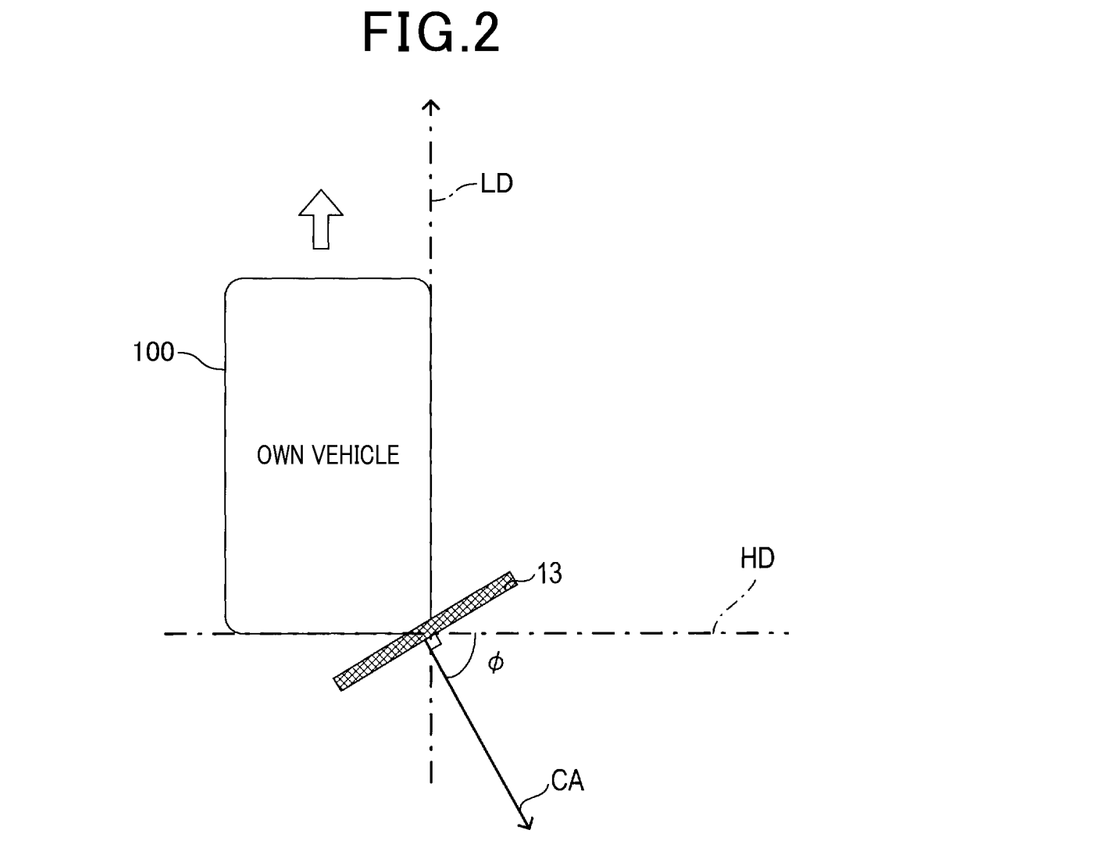
FIG. 2 is an explanatory diagram of an attachment position of a reception antenna shown in FIG. 1.

The reception antenna 13 is provided on each of the left and right ends at the rear of the own vehicle. As shown in FIG. 2, the reception antenna 13 is attached such that a center axis CA of a detection range of the reception antenna 13 faces a direction at an angle in relation to a left-right direction HD of an own vehicle 100 by an attachment angle φ towards the rear (towards the left side regarding the reception antenna 13 positioned on the left side, and towards the right side regarding the reception antenna 13 positioned on the right side). In addition, the detection range is set so as to include a direction at 90° in relation to a front-rear direction LD of the vehicle. In the present example, a reception antenna 13 that covers a range of about ±90° with the center axis CA at the center is used.

In the vehicle warning system 1 configured in this way, the signal processing unit 15 performs a traveling vehicle detection process for detecting a vehicle that is traveling near the own vehicle 100. The traveling vehicle detection process is a process that is performed at every modulation cycle Tm while the signal processing unit 15 is in operation.

Figure 3:
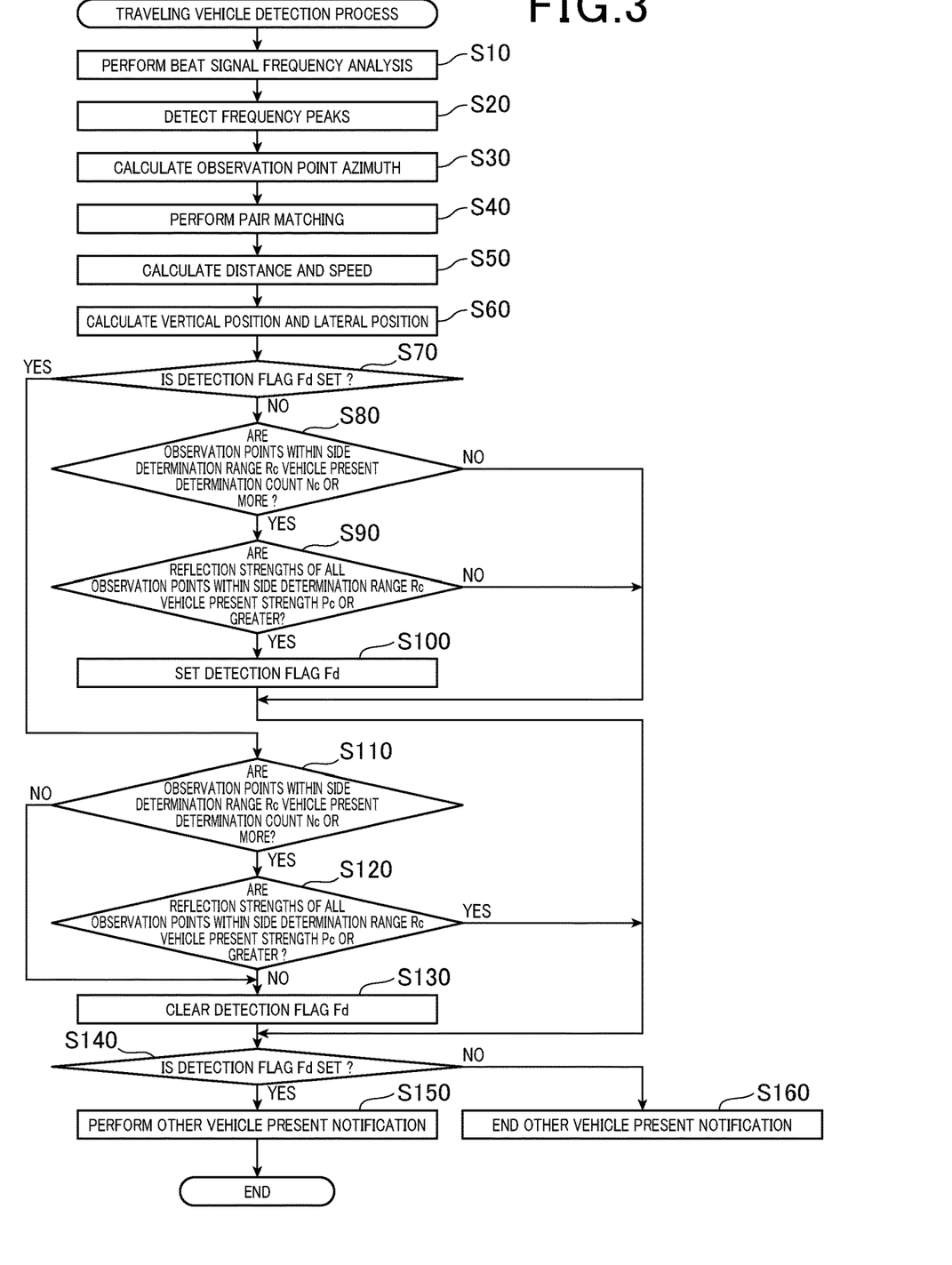
FIG. 3 is a flowchart of a traveling vehicle detection process by a signal processing unit shown in FIG. 1.

When the traveling vehicle detection process is performed, as shown in FIG. 3, first, at step S10, the signal processing unit 15 performs frequency analysis (fast Fourier transform, FFT) according to the present embodiment) of the beat signal inputted from the reception circuit 14 and determines a power spectrum of the beat signal BT. The power spectrum indicates the frequencies of the up-beat signal and the down-beat signal, and the strength of the beat signal at each frequency.

The beat signal is a real signal. Therefore, when Fourier transform is performed on the beat signal, the frequency spectrum of the beat signal has positive frequency components and negative frequency components of which the absolute values of the frequencies are equal to each other.

At step S10, the signal processing unit 15 detects the phase of the beat signal by performing an in-phase and quadrature (IQ) detection on the beat signal. Based on changes over time in the phase of the beat signal, the signal processing unit 15 detects a rotation direction of the phase of the beat signal on an IQ plane. In addition, at step S10, the signal processing unit 15 uses either of the positive frequency components and the negative frequency components on the frequency spectrum of the beat signal, based on the detected rotation direction.

Then, at step S20, the signal processing unit 15 detects frequency peaks fbu1 to m that are present on the power spectrum for the up-beat signal. In addition, the signal processing unit 15 detects frequency peaks fbd1 to m that are present on the power spectrum for the down-beat signal. The detected frequency peaks fbu and fbd each indicate that there is a possibility that a candidate for the observation point is present. In addition, a single or a plurality of observation points are detected from a single object.

Furthermore, at step S30, for each frequency peak fbd of the down-beat signal, the signal processing unit 15 calculates an azimuth (referred to, hereafter, as an observation point azimuth θ) of the observation point identified by an a peak frequency, based on, for example, phase difference information between signal components of the same peak frequency acquired from the plurality of antenna elements configuring the reception antenna 13.

Then at step S40, the signal processing unit 15 performs pair matching to pair the frequency peak fbu and the frequency peak fbd based on the same observation point. Specifically, regarding the pairing of the frequency peak fbu of the up interval and the frequency peak fbd of the down interval, whether or not a difference in peak strength and an angle difference in observation point azimuths are within predetermined allowable ranges is determined. As a result of the determination, should both the difference in peak strength and the angle difference in observation point azimuths be within the allowable ranges, the pair of corresponding frequency peaks is registered as an observation point.

Subsequently, at step S50, the signal processing unit 15 calculates the distance (observation point distance L) from the radar apparatus 4 to the observation point, and the relative speed (observation point relative speed v) between the observation point and the own vehicle, for the registered observation point by a method (see expressions (1) to (4), above) known for FMCW-type radar apparatuses.

Then, at step S60, the signal processing unit 15 calculates an observation point lateral position x and an observation point vertical position y of the registered observation point, based on the observation point distance L calculated at step S60 and the observation point azimuth θ calculated at step S30. The observation point lateral position x is a position along a vehicle width direction of the own vehicle with the reception antenna 13 as a point of origin. The observation point vertical position y is a position along an advancing direction of the own vehicle with the reception antenna 13 as the point of origin. As a result, the observation point lateral position x, the observation point vertical position y, and the observation point relative speed v of the registered observation point are identified.

Figure 4:
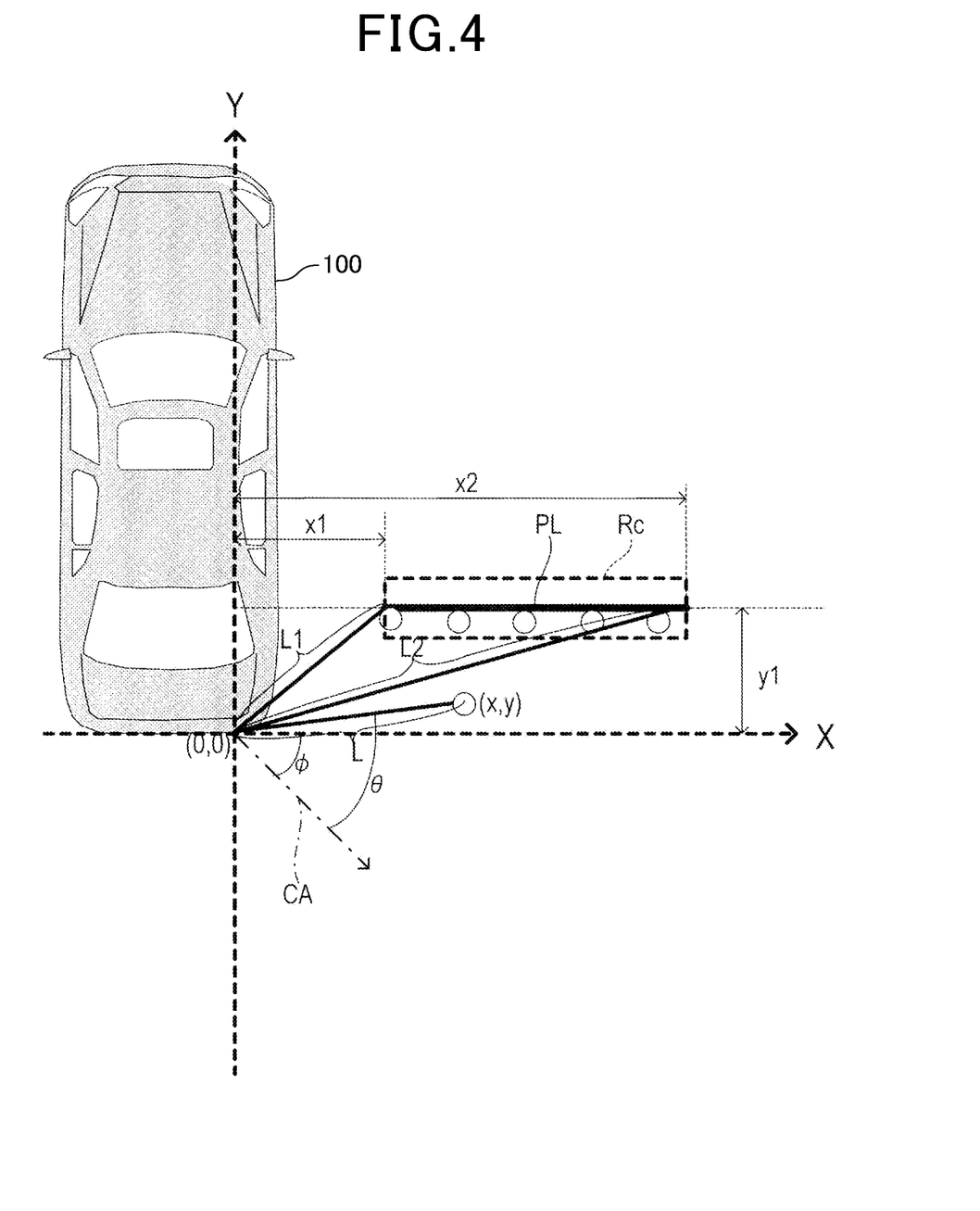
FIG. 4 is a diagram for explaining a vehicle detection method.

The observation point lateral position x and the observation point vertical position y are calculated based on the observation point distance L, the observation point azimuth θ, and the attachment angle φ, by following expressions (5) and (6) (see FIG. 4).

$$x = L \times \cos(\theta - \varphi) \tag{5}$$

$$y = L \times \sin(\theta - \varphi) \tag{6}$$

Next, at step S70, the signal processing unit 15 determines whether or not a detection flag Fd is set. The detection flag Fd indicates whether or not a vehicle is detected to the side of the own vehicle. Here, when determined that the detection flag Fd is set (YES at step S70), the signal processing unit 15 proceeds to step S110. Meanwhile, when determined that the detection flag Fd is not set (NO at step S70), at step S80, the signal processing unit 15 determines whether or not the observation points present within a predetermined side determination range Rc are equal to or more than a predetermined vehicle present determination count Nc. The vehicle present determination count Nc is an integer of 1 or greater.

As shown in FIG. 4, the side determination range Rc is set so as to include the overall passing determination line PL set so as to run along the left-right direction of the own vehicle to the side near the own vehicle 100. The passing determination line PL according to the present embodiment is a straight line of which the position of one end is (x1,y1) and the position of the other end is (x2,y1). In addition, the length of the passing determination line PL is set to be about the width of a vehicle. Furthermore, the side determination range Rc according to the present embodiment is a rectangle of which a length in a longitudinal direction is equal to the length of the passing determination line PL.

Then, as shown in FIG. 3, when determined at step S80 that the observation points present within the side determination range Rc is less than the vehicle present determination count Nc (NO at step S80), the signal processing unit 15 proceeds to step S140. Meanwhile, when determined that the observation points present within the side determination range Rc are the vehicle present determination count Nc or more (YES at step S80), at step S90, the signal processing unit 15 determines whether or not the reflection strengths of all observation points present within the side determination range Rc are a vehicle present strength Pc or greater.

The reflection strength of the observation point is the strength of the up-beat signal and the down-beat signal configuring the pair of frequency peaks corresponding to the observation point. At step S90, based on the strength of the down-beat signal as the reflection strength of the observation point, the signal processing unit 15 determines whether or not the reflection strength of the observation point is the vehicle present strength Pc or greater.

Then, when determined that, of the observation points within the side determination range Rc, an observation point of which the reflection strength is less than the vehicle present strength Pc is present (NO at step S90), the signal processing unit 15 proceeds to step S140. Meanwhile, when determined that the reflection strengths of all observation points present within the side determination range Rc are the vehicle presence strength Pc or greater (YES at step S90), at step S100, the signal processing unit 15 sets the detection flag Fd and proceeds to step S140.

In addition, when determined at step S70 that the detection flag Fd is not set (NO at step S70), at step S110, the signal processing unit 15 determines whether or not the observation points present within the side determination range Rc are the vehicle present determination count Nc or more, in a manner similar to that at step S80. Here, when determined that the observation points are less than the vehicle present determination count Nc (NO at step S110), the signal processing unit 15 proceeds to step S130. Meanwhile, when determined that the observation points are the vehicle presence determination count Nc or more (YES at step S110), at step S120, the signal processing unit 15 determines whether or not the reflection strengths of all observation points present within the side determination range Rc are the vehicle presence strength Pc or greater, in manner similar to that at step S90.

Here, when determined that the reflection strengths of all observation points are the vehicle presence strength Pc or greater (YES at step S120), the signal processing unit 15 proceeds to step S140. Meanwhile, when determined that, of the observation points within the side determination range Rc, an observation point of which the reflection strength is less than the vehicle present strength Pc is present (NO at step S120), the signal processing unit 15 proceeds to step S130.

Then, upon proceeding to step S130, the signal processing unit 15 clears the detection flag Fd and proceeds to step S140.

Then, upon proceeding to step S140, the signal processing unit 15 determines whether or not the detection flag Fd is set. Here, when determined that the detection flag Fd is set (YES at step S140), at step S150, the signal processing unit 15 makes the warning apparatus 2 perform a notification (referred to, hereafter, as an other vehicle present notification) indicating that a traveling vehicle is present near the own vehicle (when the other vehicle present notification is being performed, the signal processing unit 15 makes the warning apparatus 2 continue the state in which the other vehicle present notification is being performed). The signal processing unit 15 then temporarily ends the traveling vehicle detection process. Meanwhile, when determined that the detection flag Fd is not set (NO at step S140), at step S160, the signal processing unit 15 makes the warning apparatus 2 end the other vehicle presence notification (when the other vehicle presence notification is not being performed, the signal processing unit 15 makes the warning apparatus 2 continue the state in which the other vehicle presence notification is not being performed). The signal processing unit 15 then temporarily ends the traveling vehicle detection process.

The radar apparatus 4 of the vehicle warning system 1 configured in this way is attached to the vehicle such that the direction at 90° in relation to the front-rear direction of the vehicle is included in the detection range. The radar apparatus 4 transmits and receives radar waves In addition, the radar apparatus 4 detects the observation point distance L and the observation point azimuth θ (steps S10 to S50). Furthermore, the radar apparatus 4 calculates the observation point lateral position x and the observation point vertical position y based on the observation point distance L and the observation point azimuth θ (step S60).

Moreover, the radar apparatus 4 determines that a traveling vehicle is detected (step S100) when determined that the number of observation points included in the side determination range Rc is equal to or greater than the predetermined vehicle presence determination count Nc (YES at step S80), based on the observation point lateral position x and the observation point vertical position y. The side determination range Rc is set so as to include the passing determination line PL that is predetermined so as to extend along a direction at 90° in relation to the front-rear direction of the vehicle to the side of the vehicle.

In this way, when the number of observation points included within the side determination range Rc is the vehicle present determination count Nc or greater, the radar apparatus 4 determines that the plurality of observation points positioned at the rear end portion of the traveling vehicle have aligned along the passing determination line PL. As a result, the radar apparatus 4 can detect that the traveling vehicle has passed the side of the vehicle.

Therefore, the radar apparatus 4 can detect that a traveling vehicle has passed the side of the vehicle based on the observation point distance L and the observation point azimuth θ, without using a relative speed in relation to a detected object. As a result, the accuracy of detection of a traveling vehicle passing can be improved.

In addition, the radar apparatus 4 determines that a traveling vehicle is detected (step S100) when determined that the number of observation points included within the side determination range Rc is the vehicle present determination count Nc or greater (YES at step S80) and the reflection strengths of all observation points present within the side determination range Rc are the vehicle present strength Pc or greater (YES at step S90). As a result, an observation point having a weak reflection strength can be excluded from determination for detecting the traveling vehicle. Erroneous detection of a traveling vehicle caused by noise can be reduced.

In addition, the radar apparatus 4 detects the observation point azimuth θ using the down-beat signal (step S30). Furthermore, the radar apparatus 4 determines whether or not the reflection strengths of the observation points are the vehicle present strength Pc or greater using the down-beat signal (step S90). As a result, the time at which the observation point azimuth can be detected and the time at which whether or not the reflection strengths of the observation points are the vehicle present strength Pc or greater can be determined can be delayed, compared to that when the up-beat signal is used. The reason for this will be described below.

First, when a detected object is approaching the own vehicle, on the power spectrum, the frequency peak fbu of the up interval (referred to, hereafter as an up frequency peak fbu) moves from a positive frequency side to a negative frequency side, while maintaining a state in which the up frequency peak fbu is positioned further towards the negative side than the frequency peak fbd of the down interval (referred to, hereafter, as a down frequency peak fbd). Then, as the up frequency peak fbu approaches the negative frequency side, the up frequency peak fbu overlaps with a low frequency peak present in a low frequency region before the down frequency peak fbd, and can no longer be detected.

Meanwhile, when the detected object is moving away from the own vehicle, on the power spectrum, the up frequency peak fbu moves from the negative frequency side towards the positive frequency side while maintaining a state in which the up frequency peak fbu is positioned further towards the positive side than the down frequency peak fbd. Then, as the up frequency peak fbu moves towards the positive frequency side, the up frequency peak fbu reaches an upper limit of the detectable frequency range before the down frequency peak fbd, and can no longer be detected.

In this way, the timing at which the peak can no longer be detected is earlier for the up frequency peak fbu than the down frequency peak fbd. Therefore, as described above, of the up-beat signal and the down-beat signal, the down-beat signal is used.

In addition, in the vehicle warning system 1, when the radar apparatus 4 determines that a traveling vehicle is detected, the warning apparatus 2 performs an other vehicle present notification for the occupant of the vehicle. As a result, when a traveling vehicle is present near the own vehicle, the occupant of the vehicle can be notified of the presence.

According to the above-described embodiment, the radar apparatus 4 is an on-board radar apparatus of the present invention. The processes at steps S10 to S50 by the signal processing unit 15 are an observation detecting means of the present invention. The process at step S60 by the signal processing unit 15 is a position identifying means of the present invention. The processes at steps S80 to S100 by the signal processing unit 15 are a traveling vehicle detecting means of the present invention. The process at step S10 by the signal processing unit 15 is a strength distribution generating means of the present invention. The warning apparatus 2 is a notification apparatus of the present invention. The vehicle warning system 1 is a notification system of the present invention.

An embodiment of the present invention is described above. However, the present invention is not limited to the above-described embodiment. Various embodiments are possible as long the embodiments belong within the technical scope of the present invention.

For example, the above-described embodiment describes that the position of an observation point is detected through use of the FMCW method. However, the detection method is not limited thereto. For example, the position of an observation point may be detected through use of a two-frequency continuous-wave (CW) method.

In addition, the above-described embodiment describes that the reception antenna 13 is attached so as to face behind the own vehicle. However, the present invention is also applicable to when the reception antenna 13 is attached so as to face ahead of the own vehicle.

In addition, the above-described embodiment describes that the other vehicle present notification is performed when, in the traveling vehicle detection process performed at every modulation cycle Tm, the observation points within the side determination range Rc are the vehicle present determination count Nc or more (YES at step S80) and the reflection strengths of the observation points are the vehicle present strength Pc or greater (YES at step S90). However, the other vehicle present notification may be performed when the number of times that determinations are continuously made that the observation points within the side determination range Rc are the vehicle present determination count Nc or more and the reflection strengths of the observation points are the vehicle present strength Pc or greater is equal to or greater than a predetermined vehicle present determination count set.

In addition, the above-described embodiment describes that the other vehicle present notification is ended when the observation points within the side determination range Rc are less than the vehicle present determination count Nc (NO at step S110) or the reflection strength of an observation point is less than the vehicle present strength Pc (NO at step S120). However, the other vehicle present notification may be ended when the number of times that determinations are continuously made that the observation points within the side determination range Rc are less than the vehicle present determination count Nc or the reflection strength of an observation point is less than the vehicle present strength Pc is equal to or greater than a predetermined vehicle not-present determination count.

In addition, the above-described embodiment describes that the other vehicle present notification is ended when the reflection strength of an observation point is less than the vehicle present strength Pc (NO at step S120). However, the other vehicle present notification may be ended when the reflection strength of an observation point become less than the reflection strength (referred to, hereafter, as an at-arrival reflection strength) of when the detection flag Fd is set (that is, when the other vehicle reaches the passing determination line) by an amount exceeding a predetermined determination reduction amount. For example, with the at-arrival reflection strength as Ps, the determination reduction amount as Pd, and the current reflection strength as Pn, the detection flag Fd may be cleared when a relationship in which Pn<Ps−Pd is established.

In addition, when the reflection strength of an observation point becomes greater than the at-arrival reflection strength while the state in which the detection flag Fd is set is continuing, the at-arrival reflection strength may be updated such that the at-arrival reflection strength is equal to the current reflection strength. That is, the other vehicle present notification may be ended when the reflection strength of an observation point becomes less than the updated at-arrival reflection strength by an amount exceeding the above-described determination reduction amount.

In addition, the above-described embodiment describes that the observation point is detected based on the frequency peaks present on the power spectrum. However, the frequency range for detecting the observation point on the power spectrum may be limited to a predetermined detection frequency range. The detection frequency range is a range from a frequency F1 corresponding to an observation point distance L1 (see FIG. 4) of the position (x1,y1) on one end of the passing determination line PL and a frequency F2 corresponding to an observation point distance L2 (see FIG. 4) of the position (x1,y2) on the other end of the passing determination line PL.

As a result, the frequency range for detecting the observation point becomes narrow. Therefore, calculation processing load placed on the radar apparatus 4 can be reduced.

In addition, the above-described embodiment describes that the other vehicle present notification is performed when the observation points within the side determination range Rc are the vehicle present determination count Nc or more (YES at step S80) and the reflection strengths of the observation points are the vehicle present strength Pc or greater (YES at step S90). However, when the observation points are detected so as to be limited to the detection frequency range described above, instead whether or not the reflection strengths of the observation points are the vehicle present strength Pc or greater being determined, whether or not the reflection strengths at the frequencies within the detection frequency range are equal to or greater than a predetermined determination strength may be determined.

In addition, the above-described embodiment describes that the other vehicle present notification is ended when the observation points within the side determination range Rc are less than the vehicle present determination count Nc (NO at step S110) or the reflection strength of an observation point is less than the vehicle present strength Pc (NO at step S120). However, when the observation points are detected so as to be limited to the detection frequency range described above, instead of whether or not the reflection strength of an observation point is less than the vehicle present strength Pc being determined, whether or not the reflection strength at a frequency within the detection frequency range is less than a predetermined determination strength may be determined.

In addition, the above-described embodiment describes that a determination that a traveling vehicle is detected is made when the reflection strengths of all of the observation points present within the side determination range Rc are the vehicle present strength Pc or greater (YES at step S90). However, the determination that a traveling vehicle is detected may be made when, of the observation points present within the side determination range Rc, the number of observation points of which the reflection strength is the vehicle present strength Pc or greater is equal to or greater than a predetermined vehicle present strength determination count.

In addition, a function provided by a single constituent element according to the above-described embodiment may be dispersed among a plurality of constituent elements. Functions provided by a plurality of constituent elements may be integrated in a single constituent element. Furthermore, at least a part of a configuration according to the above-described embodiment may be replaced by a publicly known configuration having a similar function. In addition, a part of a configuration according to the above-described embodiment may be omitted. Furthermore, at least a part of a configuration according to an above-described embodiment may be added to or replace a configuration according to another above-described embodiment. All aspects included in the technical concept identified solely by the expressions recited in the claims are embodiments of the present invention.

REFERENCE SIGNS LIST

1: vehicle warning system
2: warning apparatus
4: radar apparatus

The invention claimed is:

1. An on-board radar apparatus that is attached to an own vehicle such that a direction at 90 degrees relative to a front-rear direction of the own vehicle is included in a detection range, and transmits and receives radar waves, the on-board radar apparatus comprising:
 a processor, wherein the processor is configured to:
 detect an observation point distance to an observation point that has reflected the radar waves within the detection range and an observation point azimuth at which the observation point is present;
 identify an observation point position based on the observation point distance and the observation point azimuth; and
 determine that a traveling vehicle passing a side of the own vehicle is detected in response to a number of observation points within a side determination range being changed from a state where it is less than a predetermined traveling vehicle determination count to a state where it is equal to or greater than the predetermined traveling vehicle determination count, based on the observation point position identified by the processor, the side determination range being within the detection range and being set so as to include a passing determination line that is predetermined so as to extend in a direction at 90 degrees relative to a front-rear direction of the own vehicle to the side of the own vehicle.

2. The on-board radar apparatus according to claim 1, wherein:
 the processor determines that a traveling vehicle passing a side of the own vehicle is detected when the number of observation points in the side determination range is equal to or greater than the traveling vehicle determination count and all of reflection strengths of the radar waves reflected at the observation points in the side determination range are equal to or greater than a predetermined vehicle present strength for determination of whether a traveling vehicle passing a side of the own vehicle is present.

3. The on-board radar apparatus according to claim 2, wherein:
 the processor detects the observation point distance by transmitting and receiving the radar waves by a frequency-modulated continuous-wave method;
 the processor generates a strength distribution indicating a correspondence relationship between a frequency of a beat signal generated based on the frequency-modulated continuous-wave method and a beat signal strength that is the strength of the beat signal, for a plurality of observation points; and
 the processor detects the observation point distance based on a peak in the beat signal strength present within a predetermined detection frequency range so as to correspond to the side determination range on the strength distribution.

4. The on-board radar apparatus according to claim 3, wherein:
 the processor detects the observation point azimuth using a down-beat signal generated based on the frequency-modulated continuous-wave method.

5. The on-board radar apparatus according to claim 2, wherein:
 the processor detects the observation point distance by transmitting and receiving the radar waves by a frequency-modulated continuous-wave method; and
 the processor determines whether or not the reflection strength of the radar waves is equal to or greater than the vehicle present strength, using a down-beat signal generated based on the frequency-modulated continuous-wave method.

6. A notification system comprising:
 an on-board radar apparatus that is attached to an own vehicle such that a direction at 90 degrees relative to a front-rear direction of the own vehicle is included in a detection range, and transmits and receives radar waves, the on-board radar apparatus comprising:
 a processor, wherein the processor is configured to:
 detect an observation point distance to an observation point that has reflected the radar waves within the detection range and an observation point azimuth at which the observation point is present;
 identify an observation point position based on the observation point distance and the observation point azimuth; and
 determine that a traveling vehicle passing a side of the own vehicle is detected in response to a number of observation points within a side determination range being changed from a state where it is less than a predetermined traveling vehicle determination count to a state where it is equal to or greater than the predetermined traveling vehicle determination count, based on the observation point position identified by the processor, the side determination range being within the detection range and being set so as to include a passing determination line that is predetermined so as to extend in a direction at 90 degrees relative to a front-rear direction of the own vehicle to the side of the own vehicle in the detection range; and a notification apparatus that, in response to the processor determining that the traveling vehicle passing the side of the own vehicle is detected, notifies an occupant of the own vehicle of the determination.

7. A traveling vehicle detection method of an on-board radar apparatus that is attached to an own vehicle such that a direction at 90 degrees relative to a front-rear direction of the own vehicle is included in a detection range, and transmits and receives radar waves, the traveling vehicle detection method comprising:

detecting, by the on-board radar apparatus, an observation point distance to an observation point that has reflected the radar waves within the detection range and an observation point azimuth at which the observation point is present;

identifying, by the on-board radar apparatus, an observation point position based on the observation point distance and the observation point azimuth; and determining, by the on-board radar apparatus, that a traveling vehicle passing a side of the own vehicle is detected in response to a number of observation points within a side determination range being changed from a state where it is less than a predetermined traveling vehicle determination count to a state where it is equal to or greater than a predetermined traveling vehicle determination count, based on the observation point position identified by the on-board radar apparatus, the side determination range being within the detection range and being set so as to include a passing determination line that is predetermined so as to extend in a direction at 90 degrees relative to a front-rear direction of the own vehicle to the side of the own vehicle in the detection range.

8. The on-board radar apparatus according to claim 1, wherein:

the processor detects the observation point distance by transmitting and receiving the radar waves by a frequency-modulated continuous-wave method;

the processor generates a strength distribution indicating a correspondence relationship between a frequency of a beat signal generated based on the frequency-modulated continuous-wave method and a beat signal strength that is the strength of the beat signal, for a plurality of observation points; and the processor detects the observation point distance based on a peak in the beat signal strength present within a predetermined detection frequency range so as to correspond to the side determination range on the strength distribution.

9. The on-board radar apparatus according to claim 1, wherein:

the processor detects the observation point azimuth using a down-beat signal generated based on the frequency-modulated continuous-wave method.

10. The on-board radar apparatus according to claim 2, wherein:

the processor detects the observation point azimuth using a down-beat signal generated based on the frequency-modulated continuous-wave method.

11. The notification system according to claim 6, wherein:

the processor determines that a traveling vehicle passing a side of the own vehicle is detected when the number of observation points is equal to or greater than the traveling vehicle determination count and reflection strengths of the radar waves reflected at the observation points are equal to or greater than a predetermined vehicle present strength for determination of whether a traveling vehicle passing a side of the own vehicle is present.

12. The notification system according to claim 6, wherein:

the processor detects the observation point distance by transmitting and receiving the radar waves by a frequency-modulated continuous-wave method;

the processor generates a strength distribution indicating a correspondence relationship between a frequency of a beat signal generated based on the frequency-modulated continuous-wave method and a beat signal strength that is the strength of the beat signal, for a plurality of observation points; and the processor detects the observation point distance based on a peak in the beat signal strength present within a predetermined detection frequency range so as to correspond to the side determination range on the strength distribution.

13. The notification system according to claim 6, wherein:

the processor detects the observation point azimuth using a down-beat signal generated based on the frequency-modulated continuous-wave method.

14. The notification system according to claim 6, wherein:

the processor detects the observation point distance by transmitting and receiving the radar waves by a frequency-modulated continuous-wave method; and the processor determines whether or not the reflection strength of the radar waves is equal to or greater than the vehicle present strength, using a down-beat signal generated based on the frequency-modulated continuous-wave method.

15. The on-board radar apparatus according to claim 1, wherein:

a length of the passing determination line in the side determination range is set to be about a width of the own vehicle.

16. The on-board radar apparatus according to claim 1, wherein:

the processor detects the observation point distance and the observation point azimuth by transmitting and receiving the radar waves by a two-frequency continuous-wave method.

17. The on-board radar apparatus according to claim 2, wherein:

the processor determines that a traveling vehicle passing a side of the own vehicle is detected when a number of times is equal to or greater than a predetermined count for determination of a vehicle being present, the number of times being that the processor continuously determines that:

(i) the number of observation points in the side determination range is equal to or greater than the traveling vehicle determination count; and (ii) all of the reflection strengths of the radar waves reflected at the observation points in the side determination range are equal to or greater than a predetermined vehicle present strength for determination of whether a travelling vehicle passing a side of the own vehicle is present.

18. The on-board radar apparatus according to claim 1, wherein:
the processor detects that a traveling vehicle passing a side of the own vehicle is not detected when a number of times is equal to or greater than a predetermined count for a vehicle not being present, the number of times being that the processor determines that:
(i) the number of observation points in the side determination range is less than the vehicle present determination count; or
(ii) all of the reflection strengths of the radar waves reflected at the observation points in the side determination range are less than the vehicle present strength.

19. The on-board radar apparatus according to claim 1, wherein:
the processor detects that a traveling vehicle passing a side of the own vehicle is not detected when the reflection strength of the radar waves reflected at the observation point becomes less than a first reflection strength upon determining that the traveling vehicle is detected, by an amount exceeding a predetermined reduction amount for determination.

20. The on-board radar apparatus according to claim 19, wherein:
when the reflection strength is greater than the first reflection strength during a period from a time at which the processor determines that the traveling vehicle is detected to a time at which the processor determines that the traveling vehicle is not detected, the processor updates the first reflection strength such that it is equal to a current reflection strength.

21. The on-board radar apparatus according to claim 1, wherein:
the processor detects the observation point distance by transmitting and receiving the radar waves by a frequency-modulated continuous-wave method;
the processor generates a strength distribution indicating a correspondence relationship between a frequency of a beat signal generated based on the frequency-modulated continuous-wave method and a beat signal strength that is the strength of the beat signal, for a plurality of observation points;
the processor detects the observation point distance based on a peak in the beat signal strength present within a predetermined detection frequency range so as to correspond to the side determination range on the strength distribution; and
the processor detects that a traveling vehicle passing a side of the own vehicle is detected when the number of observation points is equal to or greater than the traveling vehicle determination count and the reflection strengths at the frequencies within the detection frequency range are equal to or greater than a predetermined determination strength.

22. The on-board radar apparatus according to claim 1, wherein:
the processor detects the observation point distance by transmitting and receiving the radar waves by a frequency-modulated continuous-wave method;
the processor generates a strength distribution indicating a correspondence relationship between a frequency of a beat signal generated based on the frequency-modulated continuous-wave method and a beat signal strength that is the strength of the beat signal, for a plurality of observation points;
the processor detects the observation point distance based on a peak in the beat signal strength present within a predetermined detection frequency range so as to correspond to the side determination range on the strength distribution; and
the processor detects that a traveling vehicle passing a side of the own vehicle is not detected when the reflection strength of the radar waves at a frequency within the detection frequency range is less than a predetermined determination strength.

23. The on-board radar apparatus according to claim 1, wherein:
the processor detects that a traveling vehicle passing a side of the own vehicle is not detected when, of the observation points present in the side determination range, the number of observation points, of which the reflection strength is equal to or greater than the vehicle present strength, is equal to or greater than a predetermined count for determination of a vehicle being present.

* * * * *